JOHN DAVIES, WILLIAM HENRY JONES, JOSEPH DAVIES AND HENRY JAMES HALE.
COVERING OR INSULATION FOR SHIPS' DECKS, BULKHEADS, WALLS, FLOORS, CEILINGS, AND THE LIKE.
APPLICATION FILED SEPT. 17, 1917.
1,336,683.
Patented Apr. 13, 1920.
5 SHEETS—SHEET 1.
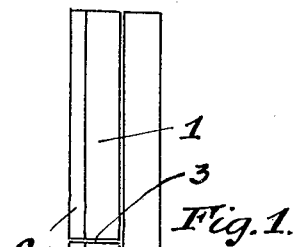
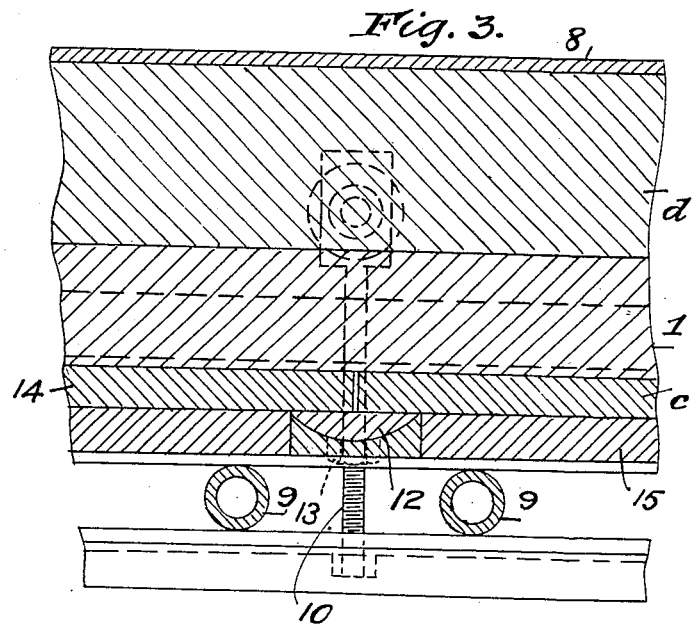
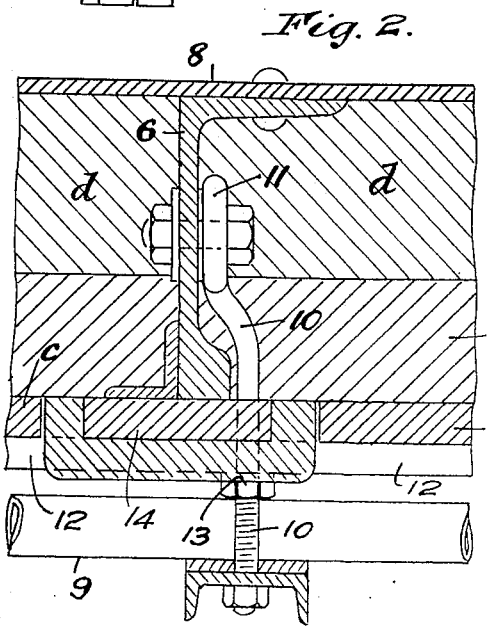
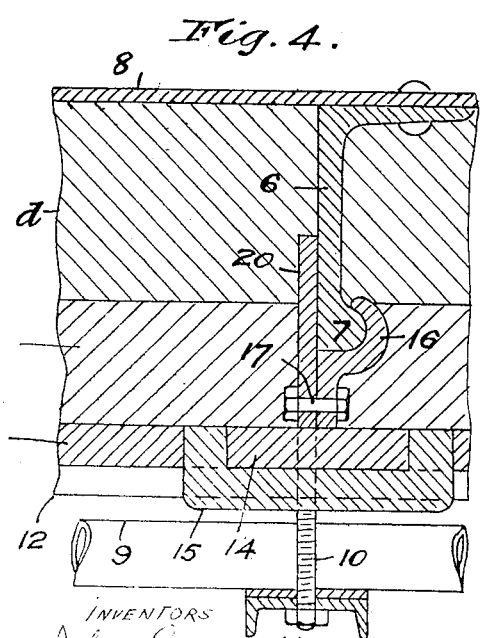

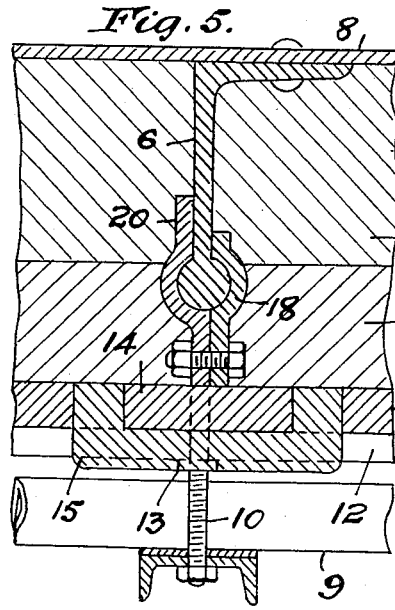
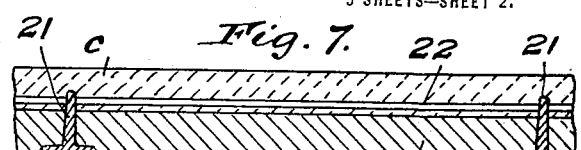
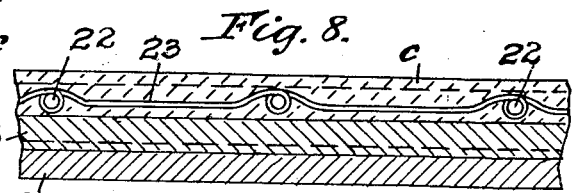
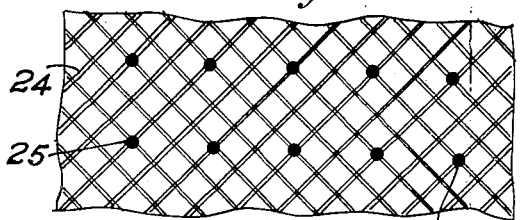
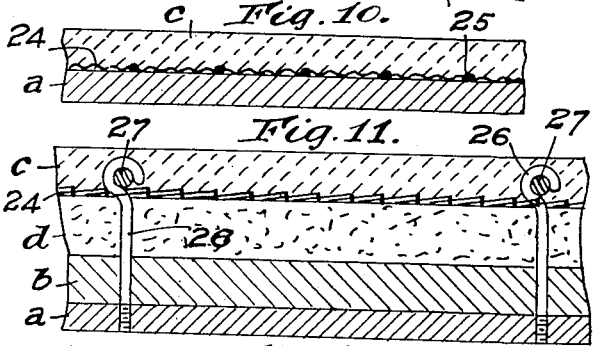
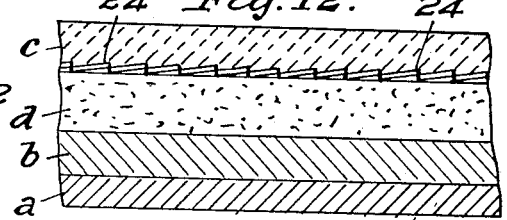

JOHN DAVIES, WILLIAM HENRY JONES, JOSEPH DAVIES AND HENRY JAMES HALE.
COVERING OR INSULATION FOR SHIPS' DECKS, BULKHEADS, WALLS, FLOORS, CEILINGS, AND THE LIKE.
APPLICATION FILED SEPT. 17, 1917.
1,336,683.
Patented Apr. 13, 1920.
5 SHEETS—SHEET 3.
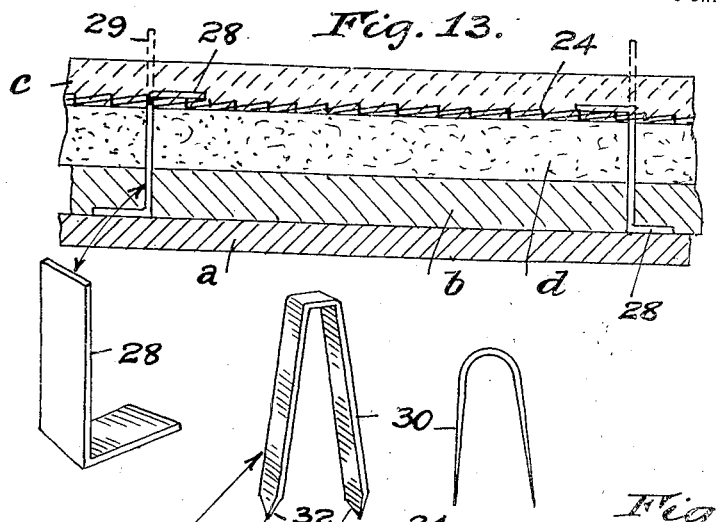
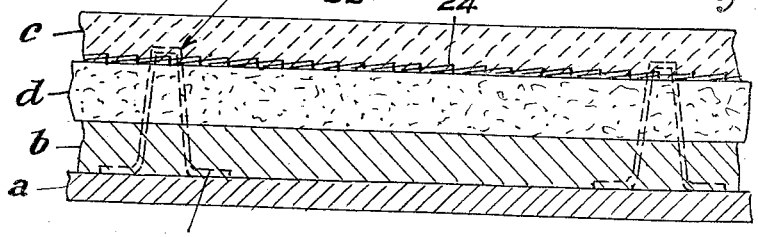
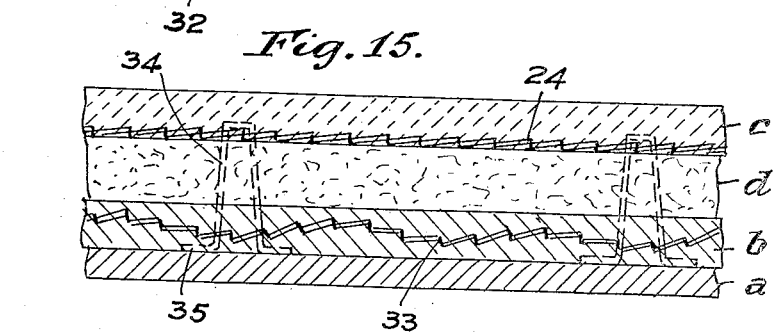
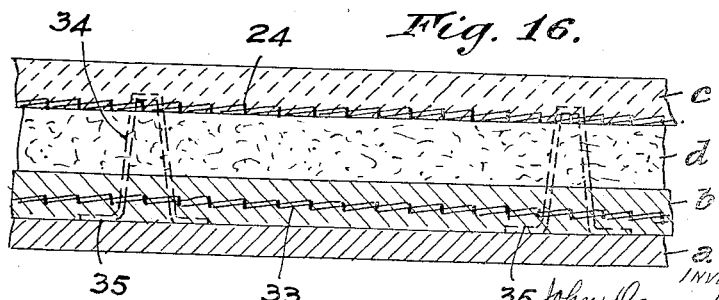
INVENTORS
John Davies, W. H. Jones,
Joseph Davies & H. J. Hale
By Henry T. Wright
Atty JOHN DAVIES, WILLIAM HENRY JONES, JOSEPH DAVIES AND HENRY JAMES HALE.
COVERING OR INSULATION FOR SHIPS' DECKS, BULKHEADS, WALLS, FLOORS, CEILINGS, AND THE LIKE.
APPLICATION FILED SEPT. 17, 1917.
1,336,683.
Patented Apr. 13, 1920.
5 SHEETS—SHEET 4.
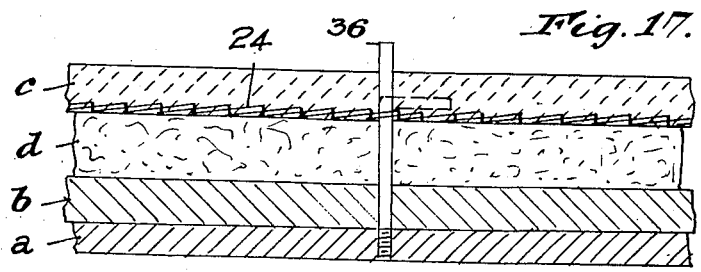
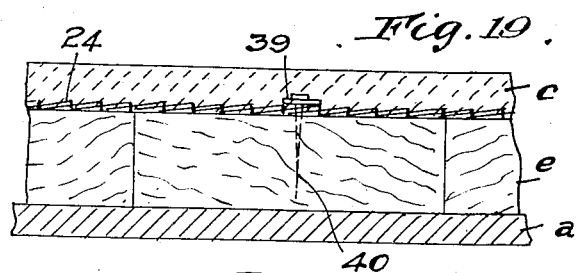
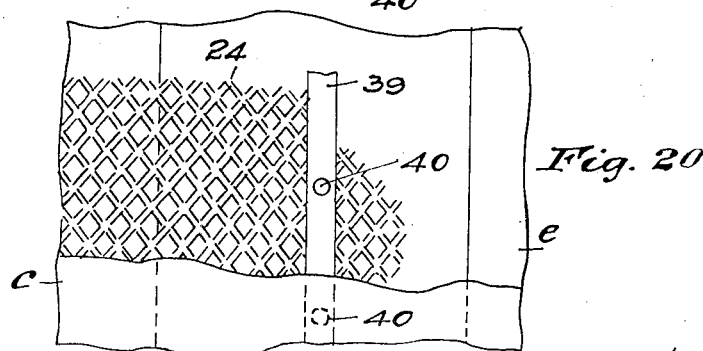
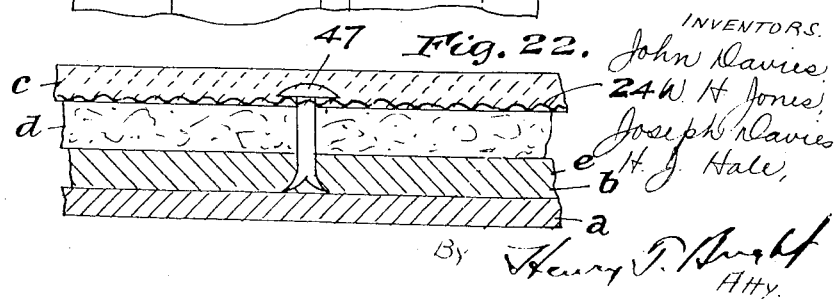
INVENTORS.
John Davies,
W. H. Jones,
Joseph Davies,
H. J. Hale,
By Henry T. Bright
Atty.

JOHN DAVIES, WILLIAM HENRY JONES, JOSEPH DAVIES AND HENRY JAMES HALE.
COVERING OR INSULATION FOR SHIPS' DECKS, BULKHEADS, WALLS, FLOORS, CEILINGS, AND THE LIKE.
APPLICATION FILED SEPT. 17, 1917.
1,336,683.
Patented Apr. 13, 1920.
5 SHEETS—SHEET 5.
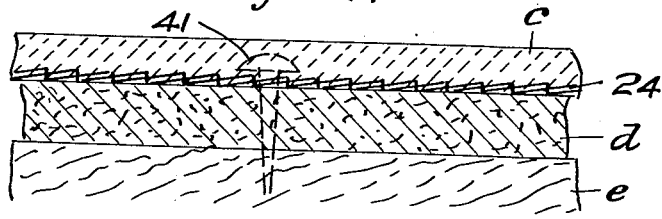
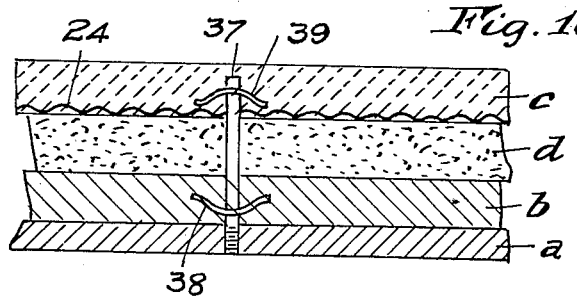
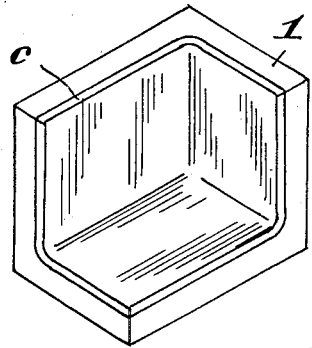
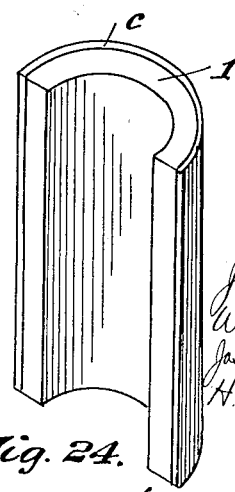

UNITED STATES PATENT OFFICE.

JOHN DAVIES, WILLIAM HENRY JONES, JOSEPH DAVIES, AND HENRY JAMES HALE, OF LIVERPOOL, ENGLAND.

COVERING OR INSULATION FOR SHIPS' DECKS, BULKHEADS, WALLS, FLOORS, CEILINGS, AND THE LIKE.

1,336,683.     Specification of Letters Patent.     Patented Apr. 13, 1920.

Application filed September 17, 1917. Serial No. 191,839.

*To all whom it may concern:*

Be it known that we, JOHN DAVIES, WILLIAM HENRY JONES, JOSEPH DAVIES, and HENRY JAMES HALE, subjects of the King of Great Britain, and residents of Liverpool, England, have invented certain new and useful Improvements in Coverings or Insulations for Ships' Decks, Bulkheads, Walls, Floors, Ceilings, and the like, of which the following is a specification.

This invention relates to improvements in non-conducting coverings or insulations for walls, floors, ceilings and the like for covering ships' decks, bulkheads, all kinds of floors, walls, partitions or the like whether of metal, wood, or other materials. Such coverings are also applicable for the cold storage chambers of ships, for the insulation of cold storages generally and for similar purposes where the regulation of temperatures is desired. It is also applicable for sound proofing walls, floors, ceilings and the like, and for the tile flooring of apartments in buildings for which purpose it is very suitable as it is not liable to crack under severe and varying strains.

In this invention the insulation may be built up of a series of unit slabs or may be continuous. Where units or slabs are used, they are composed of a layer of tough material such as compressed cork, granulated or disintegrated cork, or cork substitute, or any other suitable material coated on the face with a secondary layer of cement (reinforced with wire if necessary) or rock asphalt which is applied at the factory and then put aside to mature or dry there. The cement which we prefer to use for these compound units or slabs or pieces is composed of a mixture of magnesite, chlorid of magnesium, saw-dust, cork-dust, hair or other fibrous material, the magnesia and the magnesium chlorid acting on each other to form oxychlorid of magnesium, while the saw-dust, cork-dust, hair or other fibrous material which is mixed with it, makes the cement layer or surface of the compound unit extremely tough. It must be understood however, that we do not confine ourselves to an oxychlorid cement as other cements and rock asphalt, which will in conjunction with the slabs of tough material provide an insulation against heat and sound, and form a suitably serviceable tread surface and which will be of a more or less fire resisting nature, will answer the purpose.

In constructing the insulation of a wall, floor, ceiling or the like, we propose first to build up the insulations with continuous sheets or slabs of compressed cork or cork substitute which may be one, two, three, or four inches thick, or in fact any suitable thickness required, and in one, two or more layers. The first layer or layers (termed grounding) of compressed cork-sheet or slabs is or are secured to the wall, ceiling, floor or the like by a suitable waterproof binding material such as cement, bitumen or other suitable adhesive material. Secured to what will be the inner face of this or other layers of compressed cork sheets or slabs, we build up or assemble edge to edge a plurality of the compound units or slabs aforesaid, the said compound units or slabs being secured to the compressed cork sheets by cement or a mixture of the nature of bitumen, or other suitable adhesive material and assembled in such a manner that the joints of the compound slabs or blocks do not coincide with the joints of the compressed cork sheets or slabs.

The edges of the compound units or slabs which may be butt joined so as to lie flush, or tongued and grooved so as to interlock, or be otherwise formed, or joined, are bound or joined together by a grouting of cement or other suitable adhesive material.

For the purpose of further securing the compressed cork slabs or sheets, and the compound slabs or blocks in position more especially in overhead work or ceilings, iron beads or strips may be passed longitudinally or vertically along the face of the compound slabs and secured by hangers or palm belts to deck walls and beams or joists and by lag bolts inserted or built in concrete ceiling walls or the like upon which the insulation is built up, or by Lewis bolts inserted or built in concrete ceilings, walls, or the like, as will be described presently.

In addition to the compound insulating slabs, compound units or pieces of any suitable shape in cross sections, and either straight or worked into various forms may be used. These compound insulating units or pieces are likewise of compressed cork coated on the face with oxychlorid or other cement or rock asphalt which is applied in a plastic condition at the factory, and the said units or pieces are then put aside for the cement to mature and harden, so that when set they shall be ready for immediate use when required.

In the accompanying drawings, Figure 1 is an edge view showing the continuous compressed cork sheets *d* covered with the compound units or slabs 1, *c*, and joined together by a bituminous or adhesive mixture 5 as hereinbefore described. Figs. 2 and 3 are detail views in longitudinal and transverse section showing the method of further securing or supporting the compound slabs and the compressed cork slabs or sheets to the ceiling of a cold storage chamber by galvanized iron beading or strip. In this 6 is one of the cross beams or joists. 8 is the deck or floor above and 9 one of the brine pipes supported from the joists by means of hangers such as 10 which consists of a dependent member provided with a ring head through which the bolt 11 is passed, and fastened by a back-nut. *d* are the compressed cork sheets having secured thereto by the bituminous or adhesive mixture the compound slabs or blocks 1, *c*, and which are further prevented from being displaced by the galvanized iron beading 12 running at right angles to the joists or beams the said beading being held in place by the back nut 13 on the screwed end of the hanger 10. This beading may be curvilinear in cross section as shown. Adjacent to each joist 6 the cement portion *c* of the compressed units or slabs may be omitted, and the space filled by transverse pieces of cork 14, which lies against the joist, these pieces of cork being coated with a layer of cement 15. At the adjacent ends of the pieces of cork 14 the cement 15 may be omitted and the beading 12 arranged to overlap the said adjacent ends, so as to bind the said ends firmly in position, cement being afterward filled into the cavity so as to embed the beading therein.

Figs. 4, 5 and 6 are detail views in transverse section showing slight modifications of the method of holding the convex beading 12 in place. In these figures 6 are the cross beams or joists of different cross sectional shape, 8 the deck or floor above, 10 the hangers which consist of dependent members of flattened shape in cross section at the upper part 20 so as to rest against the beam 6, but circular in cross section at the lower part 10 and threaded to receive the back nuts 13. These hangers are fastened to the beams or joists 6 by clip members shaped to conform to the shape of the bulb or flange on the beam 6. Thus in the case of Fig. 4 the hanger which is straight is laid against the plane surface of the beam and is secured to the beam by a clip member 16 bent to conform to the cross sectional shape of the bulb 7 and is secured to the hanger by the bolt 17. In Fig. 5 both the hanger 10 at the upper part 20 and the clip 18 are bent to conform to the shape of the bulb, while in Fig. 6 the clip 19 only is bent to conform to the shape of the flange on the beam 6. In each case the beading 12 is held in place by the back nut 13. Figs. 23 and 24 are perspective views of compound insulating units or pieces built up as described of a compressed cork layer 1 coated on the face with oxychlorid or other cement *c*, Fig. 23 being an internal angle piece, and Fig. 24 a semi-cylindrical piece for lining the exterior of a pipe.

Instead of building up the covering of a plurality of compound units or slabs as aforesaid we may form continuous coverings of cement such as the cement hereinbefore mentioned which is applied in a plastic state *in situ* to the deck, floor or other surface that is desired to cover. The cement in such case is applied in the form of plaster direct to the surface (which may be of metal, wood or other material) or to continuous coverings of cork or other suitable substance laid on the surface and troweled into a perfectly seamless fire and waterproof covering or flooring. In one such arrangement shown in Figs. 7 and 8, sections at right angles, a series of angles or T-irons 21 are laid and secured by tap screws riveted or welded to the surface *a* and a coating of cement or bitumen *b* then laid on the surface, the upper portion of the webs of the T or angle irons projecting above this cement layer. In these upper portions of the webs are formed a series of perforations through which are threaded iron rods 22. Wires 23 are then interlaced transversely across and around the rods and a final covering layer of composition cement or the like *c* laid over the rods and interlaced wires, the rods and the wire forming a key by means of which the composition *c* is effectively secured and held direct to the surface *a* to be insulated. In another arrangement Figs. 9 and 10, plan and section respectively a sheet of expanded metal or mesh wire 24 or the like is laid in direct contact with the metal surface *a* to be insulated and the expanded metal or other metallic mesh is secured to the metal surface by arc or acetylene welding or by soldering or other suitable method of securing same at several, preferably equidistant points 25. The expanded metal or mesh wire 24 is thus positively knitted to the metal surface *a* and a coating of composition *c* is then laid upon the expanded metal or mesh wire 24, the non-conducting composition entering the meshes of the expanded metal or wire mesh and being firmly keyed to the surface $a$. The primary covering $b$, Figs. 7 and 8 on the metallic surface may be of any suitable cement or bitumen adapted to make an adhesive contact, such as Portland cement or the like, and the outer or final non-conducting covering $c$ may be of asphalt, Portland cement, or an oxychlorid cement such as magnesite. In a further method of securing the composition on a metallic surface, Fig. 11, eye-clips 26 screwed into the metal plating $a$ are provided, a primary layer of cement or bitumen $b$ being then laid over the surface $a$ and a secondary layer of compressed cork slabs $d$ bedded in on top of the cement while the latter is still wet. Over this compressed cork layer $d$ are fixed sheets of expanded metal 24 or other netting the meshes of which are passed over the eye-clips 26 when open, and rods 27 then inserted through the eyes of the clips which are closed down and a final coating of composition $c$ then laid over to a depth sufficient to cover the eye bolt heads, the composition entering the meshes of the expanded metal 24 and being thereby directly held to the metal plating $a$. In such an arrangement where it may not be desired to screw the eye clips into the metal plating, the feet of the clips may be formed as lag bolts and embedded in the layer of cement $b$ immediately next the metal plating. As a modification of the previously described arrangement, in place of eye-clips carrying transverse rods, angle brackets 28, Fig. 13 may be laid in position on the plating $a$ and a layer of cement or bitumen $b$ and compressed cork slabs $d$ placed thereon and expanded metal 24 threaded over the upper ends 29 of the angle brackets these upper ends being then flattened down on the expanded metal to hold it in place, the final covering layer of composition $c$ being then put on as previously described. And in place of the angle brackets, clips 30 Fig. 14 formed in the manner of cleats with two depending shanks may be provided, such clips being driven through the expanded metal 24 and the compressed cork slab layer $d$ beneath and entering the layer of cement or bitumen $b$ next the plating $a$, the tangs 32 of the clips opening out laterally when they make contact with the plating $a$ and thus obtaining a secure anchorage to the cement layer $b$, or bed, and such grip may be further increased by punching out small portions of metal from the lower ends 32 of the clip tangs so as to form projecting toothed pieces which become embedded in the cement bed. Or as shown in Fig. 12 the expanded metal 24 may be merely laid on the compressed cork slabs $d$ and covered with the composition $c$. Where desired, this lower layer $b$ of cement or bitumen may be reinforced by expanded metal sheeting 33 or the like Figs. 15 and 16 embedded in the cement and either flat, Fig. 16 or corrugated, Fig. 15, the upper expanded sheet metal 24 on which the final layer of composition $c$ is laid being then secured by means of cleats 34 which are driven down and on meeting the deck $a$ are expanded laterally at 35 as previously described. In this arrangement, therefore, the cleats pass through two sheetings of expanded metal 24, 33.

In place of the metallic angle brackets as shown in Fig. 13, simple rods 36, Fig. 17, may be screwed into the metal plating $a$ and after a primary layer of cement or bitumen $b$ and then a layer of compressed cork slabs $d$, the expanded sheet metal is placed over the upstanding rods 36 and the tops of the rods bent down as shown in dotted lines to form brackets for holding the expanded metal securely to the metal surface $a$, a coating of composition $c$ being then put on to finish the covering, or as in Fig. 18, short upstanding rods 37 may be screwed, welded, or soldered to the plating $a$ and cup shaped disks 38 placed over the rods and embedded in the primary layer of cement or bitumen $b$, the compressed cork slabs $d$ being then placed over the cement, expanded metal 24 laid on, and further disks 39 placed over the rod ends and held by nuts or soldered, or the rod ends may be riveted, and the final covering of composition $c$ then laid on. The cup shaped disks act as keys, any tendency to lift, binding them the more effectually on the rods 37. If desired textile woven material may be used in place of the expanded metal, and also inserted between the plating $a$ and the cement or bitumen $b$.

Where the non-conducting covering is to be applied to a wooden surface as in Figs. 19 and 20, expanded sheet metal 24 may be laid over the surface, iron bands 39 being then laid across and over the expanded metal 24 and nails 40 driven through the bands into the wooden surface $e$, the final covering of composition $c$ being then laid over the expanded metal; or as in Fig. 21, a layer of compressed cork slabs $d$ may be placed over the wooden surface $e$ expanded sheet metal 24 placed upon the compressed cork slabs $d$ and secured to the surface by flat headed nails 41 driven through the expanded sheet metal 24 and compressed cork slab into the wooden surface $e$ the final composition $c$ being then laid over the expanded sheet metal.

Expanded sheet metal 24, Fig. 22 may be secured to the wooden surface by mushroom headed nails 47 having split or forked points, the forks of which spread after entering the wood and form an anchor to the wood deck holding the expanded metal securely down. This system may also be used for cement, as shown in the illustration. In every case the final covering of non-conducting composition *c* is laid over the expanded metal 24 and is keyed to the surface.

We claim:

1. A non-conducting covering or insulation for walls, ceilings, floors or the like, comprising, a primary foundation of continuous sheets of compressed cork in one, two, or more, layers, covered with a plurality of independent slabs or units made of compressed cork coated on the face with a secondary layer of oxychlorid, a layer of bituminous mixture being interposed between the cork sheets and the independent slabs, and a jointing composition being laid between the abutting edges of the unit slabs.

2. In combination with a non-conducting covering composed of a primary layer of continuous compressed cork sheets and an outer layer of oxychlorid, beadings laid along the face of the outer covering, hangers or stays secured to a fixed part on the surface to be insulated and engaging the beadings, and back-nuts on the hangers or stays for supporting the beadings firmly against the face of the outer covering.

3. A non-conducting covering or insulation for decks, floors or other surfaces comprising a primary covering of cement or bitumen laid on the surface, a secondary layer of unit sheets of compressed cork, an interlaced system of wires and rods arranged over the unit sheet layer of compressed cork, and a final coating of composition laid over the wires and rods.

4. A non-conducting covering or insulation for decks, floors, or other surfaces, comprising a primary layer of unit sheets of compressed cork, expanded metal or metallic mesh laid next to said primary layer and secured to the surface to be insulated, and a coating of composition keyed to said primary layer by the expanded metal or the like.

5. A non-conducting covering or insulation for decks, floors or other surfaces, comprising, a primary covering of cement next the surface to be insulated, a secondary layer of compressed cork slabs over the cement, expanded sheet metal or metallic mesh laid on the cork and a final coating of composition.

6. A non-conducting covering or insulation for decks, floors, or other surfaces, comprising a primary covering of cement next the surface to be insulated, a secondary layer of compressed cork slabs over the cement, expanded sheet metal or metallic mesh laid on the cork and secured to the surface by fastening devices, and a final coating of composition.

7. A non-conducting covering or insulation for decks, floors, or other surfaces, comprising, a primary covering of cement next the surface to be insulated, expanded sheet metal embedded in and reinforcing the primary covering, a secondary layer of compressed cork slabs over the cement, expanded sheet metal or metallic mesh laid on the cork, and a final coating of composition.

In testimony whereof we affix our signatures in presence of two witnesses.

JOHN DAVIES.
WILLIAM HENRY JONES.
JOSEPH DAVIES.
HENRY JAMES HALE.

Witnesses:
ESTHER HEGINBOTHAM,
A. J. DAVIES.